US006789072B1

(12) United States Patent
Kim et al.

(10) Patent No.: US 6,789,072 B1
(45) Date of Patent: Sep. 7, 2004

(54) METHOD AND APPARATUS FOR SEARCHING RECORDED DIGITAL DATA STREAMS USING PACKET ARRIVAL TIME INFORMATION

(75) Inventors: Byung-Jin Kim, Kyunggi-do (KR); Kang-Soo Seo, Kyunggi-do (KR); Jea-Yong Yoo, Seoul (KR); Ki Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/500,488

(22) Filed: Feb. 9, 2000

(30) Foreign Application Priority Data

Feb. 9, 1999 (KR) ............................................. 99-04467
Jan. 7, 2000 (KR) ......................................... 2000-00715

(51) Int. Cl.⁷ ............................................. G06F 17/30
(52) U.S. Cl. ....................... 707/3; 707/102; 707/104.1; 386/85; 386/100
(58) Field of Search ............................. 707/1, 500.1, 3, 707/102, 104.1; 370/504, 473; 386/85, 100, 98

(56) References Cited

U.S. PATENT DOCUMENTS 5,666,365 A * 9/1997 Kostreski .................... 348/614
6,009,226 A * 12/1999 Tsuji et al. .................... 386/46
6,119,213 A * 9/2000 Robbins ....................... 711/202
6,233,389 B1 * 5/2001 Barton et al. ................. 386/46
6,317,440 B1 * 11/2001 Sung ........................... 370/505
6,321,252 B1 * 11/2001 Bhola et al. ................. 345/753
6,356,706 B1 * 3/2002 Ando et al. .................. 386/111
6,456,783 B1 * 9/2002 Ando et al. .................. 386/125
6,470,135 B1 * 10/2002 Kim et al. ..................... 386/68
6,553,086 B1 * 4/2003 Yoo et al. .................... 375/354

OTHER PUBLICATIONS

Der MPEG–2–Standard, U. Riemann, Fernseh–Und Kino––Technik, 48, Jahrgang NR. Oct. 1994, pp. 545, 548–550 and 553 (with English summary).

* cited by examiner

*Primary Examiner*—Jean R. Homere
*Assistant Examiner*—Leslie Wong
(74) *Attorney, Agent, or Firm*—Birch, Stewart, Kolasch & Birch, LLP

(57) ABSTRACT

A method and apparatus for recording time information for received digital data streams to be recorded on a recording medium such as a digital video disk and searching the recorded digital data streams using the time information. The format of the time information is the same as that of the time data in the navigation information and the time information is used as the low-unit time value of the arrival time of data stream in the case of data search. The error in the start position of each stream object unit, resulting from insufficient resolution of the packet arrival time format, is corrected without additional information indicative of the offset between the start time of a stream object unit and the time value obtained from incremental arrival time information, thereby enabling precise and fast data search capability and increasing recording efficiency.

8 Claims, 9 Drawing Sheets

FIG. 1

Conventional Art

FIG. 2

*Conventional Art*

FIG. 3

Conventional Art

FIG. 4

| Stream OBject Information (SOBI) | Stream OBject General Information (SOB_GI) | |
|---|---|---|
| | Mapping List (MAPL) | Incremental APAT # 1 (IAPAT #1) |
| | | ⋮ |
| | | Incremental APAT # N (IAPAT #N) |

*Conventional Art*

FIG. 5

| SOB_GI | | |
|---|---|---|
| SOBU_SZ | Minium Mapping Unit Size | 2 Bytes |
| MTU_SHFT | Mapping Time Unit Shift | 1 Bytes |
| Reserved | Reserved | 1 Byte |
| MAPL_ENT_Ns | Number of Mapping List Entries | 4 Bytes |
| S_S_APAT | Stream Start APAT | 8 Bytes |
| S_E_APAT | Stream End APAT | 8 Bytes |

(a)

| Incremental APAT | | |
|---|---|---|
| IAPAT | Incremental APAT | 2 Bytes |

(b)

*Conventional Art*

FIG. 6

PAT_base : 90 KHz unit, PAT_ext : 27 MHz unit ( 0 ~ 299 )

(a)

PAT : 27 MHz unit (b)

*Conventional Art*

FIG. 7

PAT_base : 90 KHz unit , PAT_ext : 27 MHz unit ( 0 ~ 299 )

(a)

PAT_base : 90 KHz unit , PAT_ext : 27 MHz unit ( 0 ~ 299 )

METHOD AND APPARATUS FOR SEARCHING RECORDED DIGITAL DATA STREAMS USING PACKET ARRIVAL TIME INFORMATION

BACKGROUND OF THE INVENTION

1. Field of the Invention

The present invention relates to a method and apparatus for creating time information for searching digital data streams to be recorded on a recording medium and a method and apparatus for searching for requested data using the created time information.

2. Description of the Related Art

In the conventional analog television broadcast, video signals are transmitted over the air or through cables after being AM or FM modulated. With the recent advance of digital technologies such as digital image compression or digital modulation/demodulation, standardization for digital television broadcast is in rapid progress. Based upon the Moving Picture Experts Group (MPEG) format, satellite and cable broadcast industry also moves towards the digital broadcast.

The digital broadcast offers several advantages that its analog counterpart cannot provide. For example, the digital broadcast is capable of providing services with far ore improved video/audio quality, transmitting several different programs within a fixed bandwidth, and offering enhanced compatibility with digital communication media or digital storage media.

In the digital broadcast, a plurality of programs encoded based upon the MPEG format are multiplexed into a single transport stream before transmitted. The transmitted transport stream is received by a set top box at the receiver and demultiplexed into original programs. If a program is chosen from among the demultiplexed programs, the chosen program is decoded by a decoder in the set top box and original audio and video signals are retrieved. The retrieved audio and video signals can be presented by an A/V output apparatus such as a TV.

It is also possible to record the received digital broadcast signals on a storage medium instead of directly outputting the received broadcast signals to A/V output devices. The stored digital broadcast signals can be edited and retrieved afterwards. For example, a digital data stream received by the set top box can be transmitted to a streamer such as a digital video disk (DVD) recording apparatus through communication interfaces like an IEEE-1394 serial bus and stored on a recording medium by the streamer. The recorded digital data stream can be edited and transmitted back to the set top box so that the digital audio and video data can be presented.

When recording the digital data stream of a single program on a recording medium in a streamer, the basic recording unit is a stream object (SOB) comprising a series of stream object units (SOBUs). To record received digital data streams on a recording medium and to reproduce the recorded data afterwards, it is necessary to explore how to group and record stream objects (SOBs) and stream object units (SOBUs) and how to create search information for managing and searching for the recorded stream objects (SOBs) and stream object units (SOBUs). Also, it is required to investigate how to search a specific data stream corresponding to a search time requested by a user.

A conventional method for recording digital data streams and creating and recording navigation information will now be explained with reference to the accompanying drawings.

Figure 1:
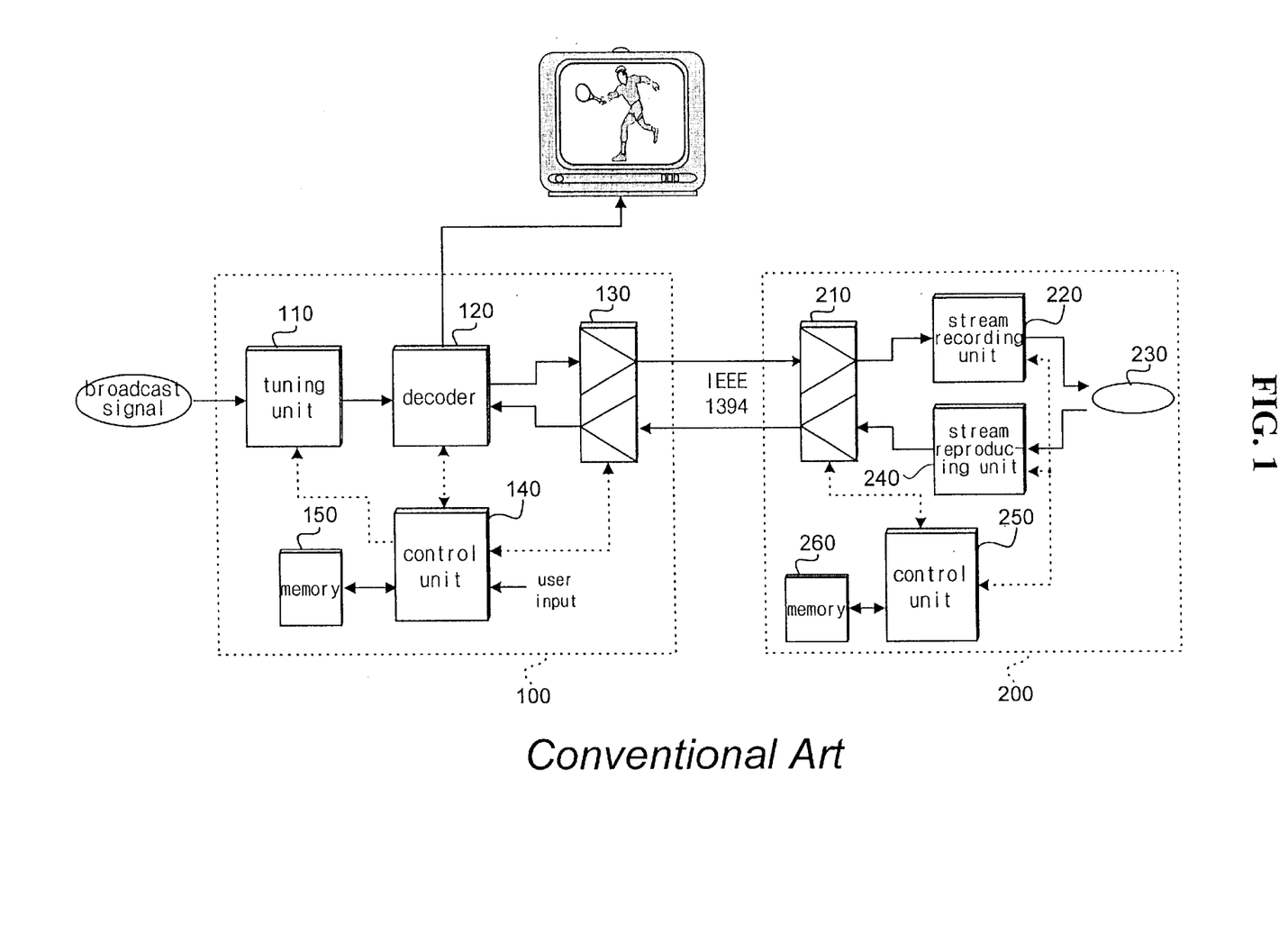
FIG. 1 is a block diagram of an apparatus in which a conventional method for creating and recording the navigation information for digital data streams and for searching recorded digital data streams using the navigation information can be employed.
Figure 2:
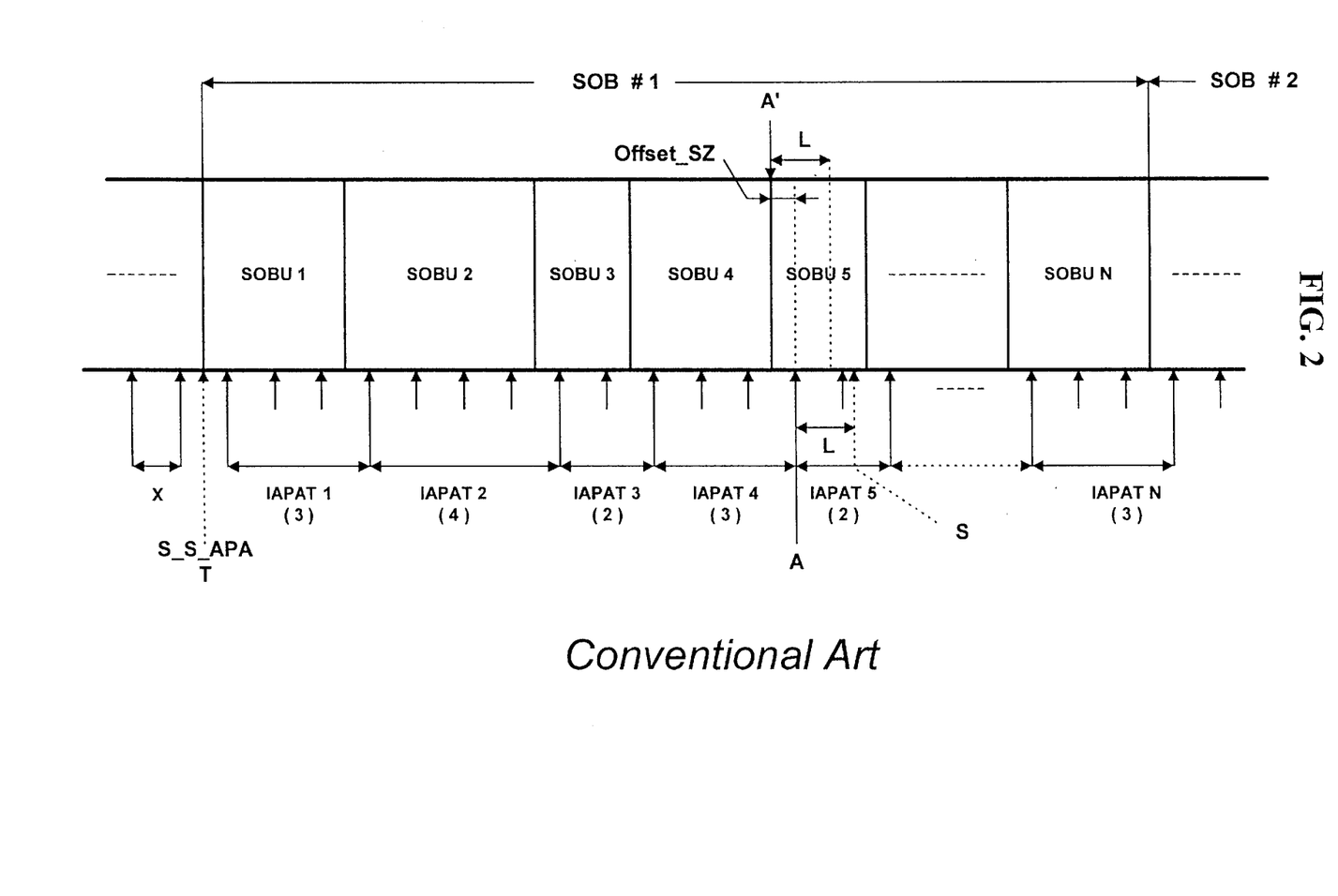
FIG. 2 is a pictorial representation of a general process for creating and recording the navigation information.

FIG. 1 depicts a block diagram of an apparatus in which the conventional method for creating and recording the navigation information for recorded digital data streams can be employed. FIG. 2 depicts the process of recording digital data streams and creating the navigation information in the system shown in FIG. 1. The system comprises a set top box 100, a communication interface (IEEE-1394), and a streamer 200. The set top box 100 receives transport streams encoded by system encoders and broadcast by a plurality of broadcast stations and demultiplexes the received transport streams. After a decoder 120 decodes the transport stream of a program tuned by a tuning unit 110, a control unit 140 outputs the decoded transport stream to an A/V output apparatus or to the streamer 200 through the IEEE-1394 communication interface 130 and 210 so that the transmitted program can be recorded on a recording medium 230 by the streamer 200, depending upon a user's choice When requested by a user, the streamer 200 retrieves the recorded program and transmits the retrieved program through the IEEE-1394 communication interface back to the set top box 100. In the set top box 100, the received program is decoded by the decoder 120 and then outputted to an A/V output apparatus so that the recorded program can be presented.

A control unit 250 of the streamer 200 controls a stream recording unit 220 to record the data stream transmitted from the set top box 100 on the recording medium 230, as shown in FIG. 2. The received data stream consisting of transport stream packets is recorded on the recording medium along with the packet arrival time (PAT) of each transport stream packet. The transport stream packets with packet arrival times are organized in sectors on the recording medium, with each sector having a predetermined size. A predetermined number of sectors, for example 32 sectors, are grouped into a stream object unit (SOBU). If the recording process is stopped or suspended by a user, the recorded stream object units (SOBUs) are grouped into a stream object (SOB). Additionally, navigation data such as the stream start application packet arrival time (S_S_APAT) and incremental application packet arrival time (IAPAT) for managing and searching for the stream object (SOB) and stream object units (SOBUs) is recorded together with the transport stream packets on the recording medium.

Figure 3:
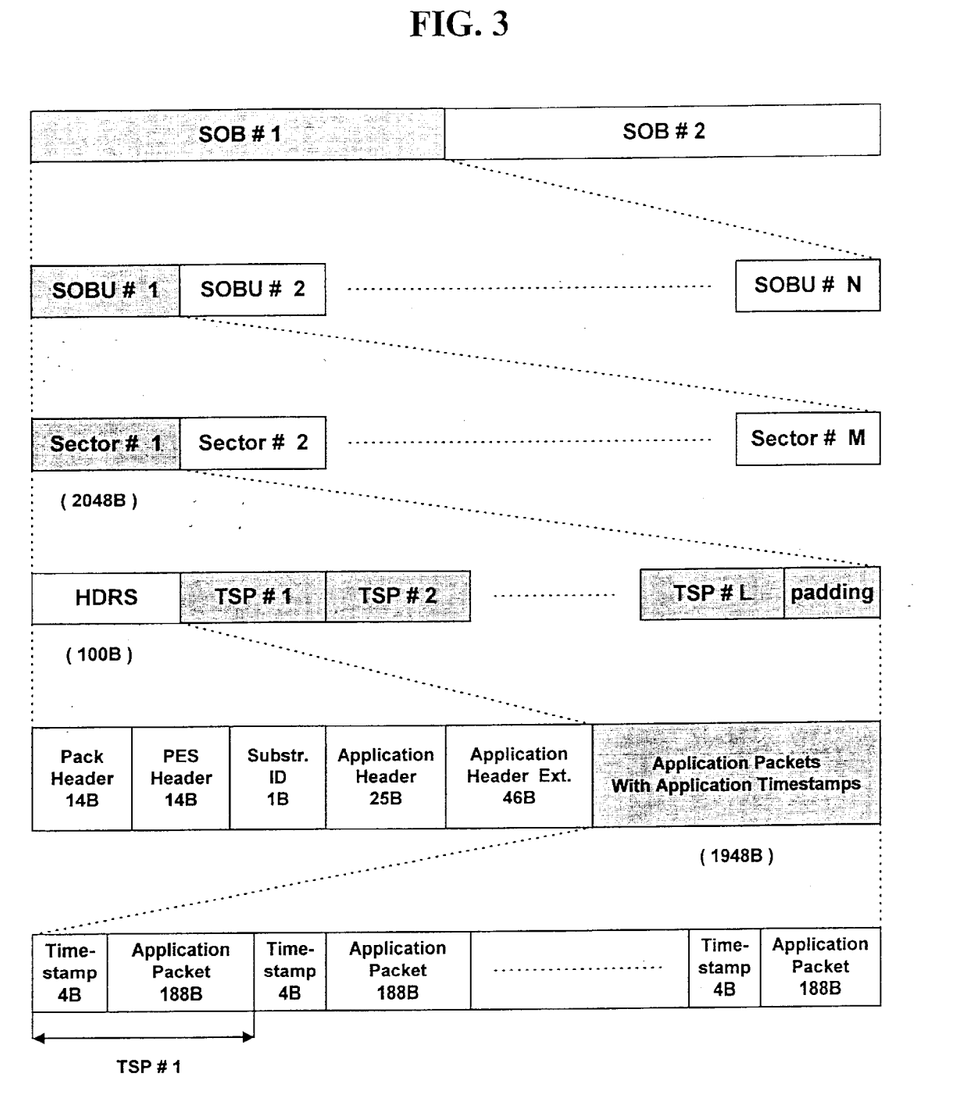
FIG. 3 is a pictorial representation showing the conventional hierarchical structure of a recorded digital data stream.
Figure 4:
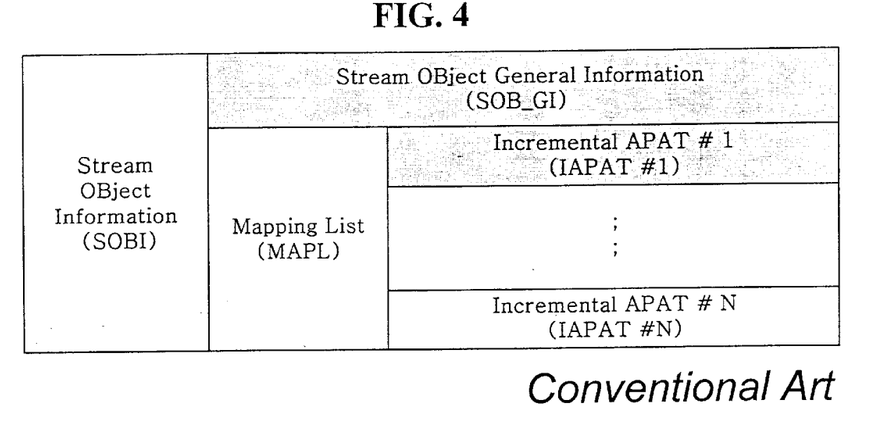
FIG. 4 is a table showing the conventional navigation information for a recorded data stream.
Figure 5:
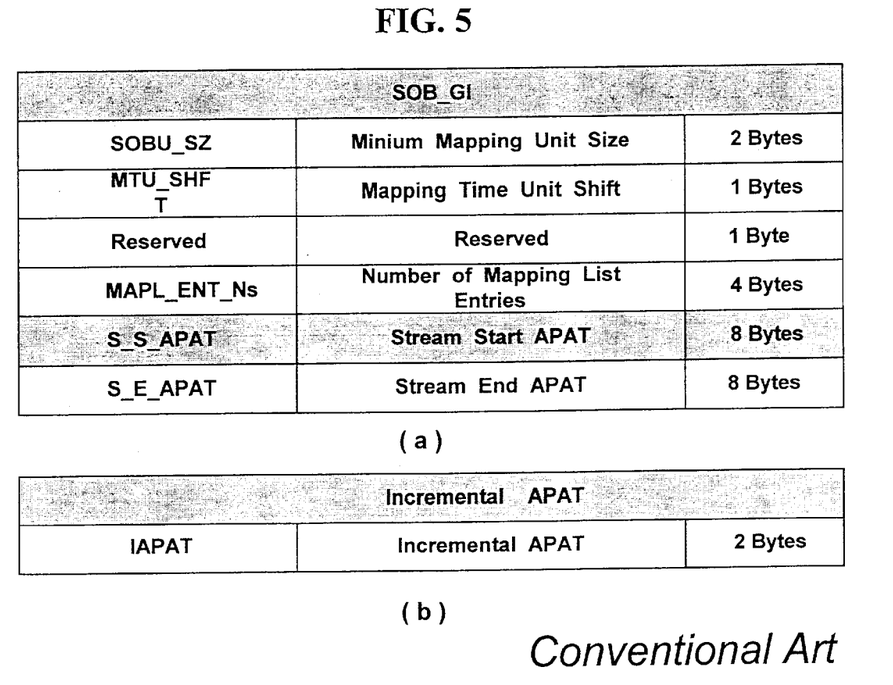
FIG. 5 is a table detailing a part of the conventional navigation information of a recorded data stream.

FIG. 3 shows the way the received digital data stream is recorded on the recording medium 230. An application packet and its packet arrival time (PAT or time stamp) constitute a transport stream packet (TSP). A plurality of transport stream packets (TSPs) and header information are organized into a sector and a predetermined number of sectors, for example 32 sectors, constitute a stream object unit (SOBU). A series of stream object units (SOBUs) constitutes a stream object (SOB). Meanwhile, the stream object information (SOBI), which is the navigation data for managing and searching the recorded stream object (SOB), comprises stream object general information (SOB_GI) and a mapping list (MAPL) for managing stream object units (SOBUs) contained in the stream object (SOB), as shown in FIGS. 4(a), 5(b) and (b). The stream object general information (SOB_GI) includes the stream start application packet arrival time (S_S_APAT) indicative of the start time of the associated stream object (SOB). As shown in FIG. 2, the incremental application packet arrival time (IAPAT), which is a count value counted at constant time intervals (x) between two consecutive stream object units (SOBUs), is included in the mapping list (MAPL) and used as information for searching for the associated stream object units (SOBUs).

Figure 6:
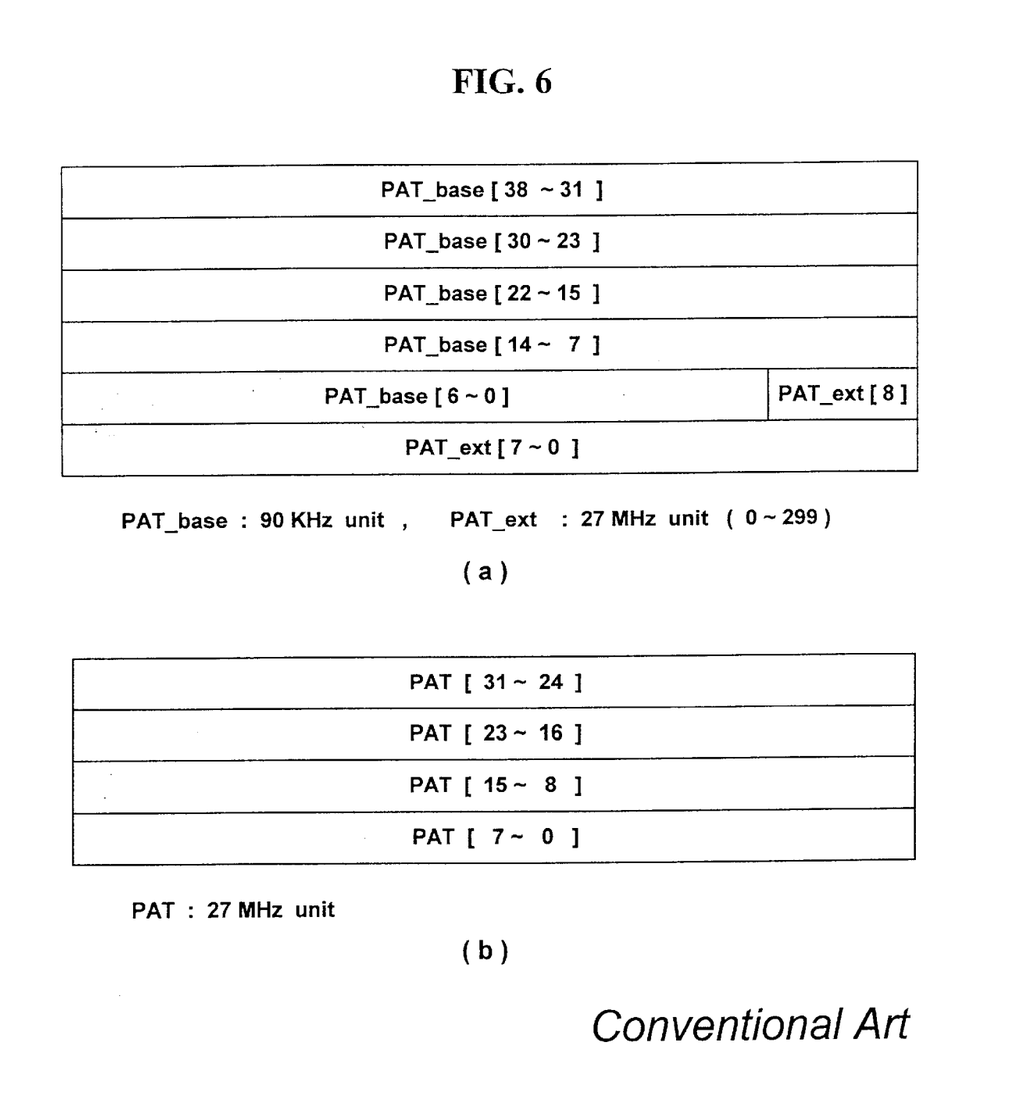
FIG. 6 is a table showing the conventional time information for a recorded data stream.

The stream start application packet arrival time (S_S_APAT) contained in the stream object general information (SOB_GI) is recorded as a 6-byte packet arrival time (PAT) comprising a 9-bit packet arrival time extension (PAT_ext) and a 39-bit packet arrival time base (PAT_base), as shown in FIGS. 6(a) and 6(b). The packet arrival time extension (PAT_ext) is a modulo-300 counter that is incremented at a rate of 27 MHz, whereas the packet arrival time base (PAT_base) is incremented at a rate of 90 kHz. Unlike the stream start application packet arrival time (S_S_APAT), the time stamp recorded along with the application packet shown in FIG. 3 is recorded as a 4-byte packet arrival time (PAT) that is incremented at a rate of 27 MHz and thus can represent from 0 s up to 159 s (=$2^{32}$/27 MHz).

The method for searching for a transport stream packet corresponding to requested search time using the navigation and time information regarding the stream object (SOB), stream object units (SOBUs) will be explained in detail with reference to an example.

Suppose that the position (s) of a transport stream packet corresponding to the search time (ST) requested by a user is to be searched for, as shown in FIG. 2. First, the stream start application packet arrival time (S_S_APAT) contained in the stream object general information (SOB_GI) of each stream object (SOB) is compared with the requested search time (ST) and a stream start application packet arrival time (S_S_APAT) that is closest to but does not exceed the request search time (ST) is detected. Referring to the mapping list (MAPL) of the stream object SOB #1 containing the detected stream start application packet arrival time (S_S_APAT), the incremental application packet arrival time (IAPAT 1~4) contained in the mapping list (MAPL) are summed up. The sum value is multiplied by the unit time (x) and added to the detected stream start application packet arrival time (S_S_APAT). The procedure is repeated until the calculated value (S_S_APAT+x×ΣIAPAT) approaches the requested search time (ST) without exceeding it. In FIG. 2, the summation and multiplication is repeated to include IAPAT 4 because the calculated value exceeds the search time (ST) if the calculation continues to IAPAT5. Then, the entry in the mapping list (MAPL) corresponding to the calculated time (S_S_APAT+x×ΣIAPAT) is located and the index of the entry is multiplied by the number of sectors constituting a stream object unit (for example, 32 sectors) to locate the desired stream object unit SOBU 5.

From the start position A' of the searched stream object SOBU 5, the 4-byte packet arrival time (PAT), which is the time stamp of the transport stream packet, is detected. Recall that the stream start application packet arrival time (S_S_APAT) and the packet arrival time (PAT) of a transport stream packet have different formats and therefore the two values cannot be directly compared. For this reason, the difference between the detected packet arrival time (PAT) and the packet arrival time of the first transport stream packet of the stream object unit SOBU 5 is compared with the difference between the requested search time (ST) and the calculated value (S_S_APAT+x×ΣIAPAT) for fine search of the transport stream packet corresponding to the requested search time (ST).

The position A searched based upon the time information (S_S_APAT+x×ΣIAPAT) calculated using the incremental application packet arrival times (IAPATs), however, does not coincide with the actual start position A' of the stream object unit SOBU 5, as shown in FIG. 2. Therefore, the offset between the transport stream packet position A detected by the fine search operation and the actual position A' results in a delay in the search operation.

As a result, additional information indicative of the offset value between A' and A (Offset_SZ in FIG. 2) is necessary for precisely searching for the position (s) of the transport stream packet corresponding to the requested search time (ST). It is not desirable, however, to add the additional information to every stream object unit (SOBU), which dramatically lowers the recording efficiency of the recording medium.

SUMMARY OF THE INVENTION

It is an object of the present invention to provide a method and apparatus for creating search information for recorded digital data streams and a method and apparatus for searching digital data streams using the search information. According to the present invention, the time information for management and search of recorded digital data streams has the same time base as the time information used in navigation data for digital data streams and thus no information on the position offset is required. The overflow of the packet arrival time due to insufficient length of the packet arrival time data is detected and correction of time data is performed to prevent search error resulting from the overflow.

The method for creating search information for recorded digital data streams according to the present invention comprises recording received digital transport stream units on a recording medium by grouping a predetermined number of transport stream units into a stream object unit and adding reference information on arrival time to each transport stream unit, each transport stream unit having a predetermined length; counting a stream object unit being recorded at constant time intervals and recording a counted value as time length information regarding the stream object unit; and recording information indicating whether the reference information added to each transport stream unit is reset within an arbitrary stream object unit accessed by the recorded time length information.

The method for searching recorded digital data streams according to the present invention comprises retrieving search time information comprising count values counted at constant time intervals while each stream object unit is recorded, each stream object unit consisting of a predetermined number of transport stream units;

accessing a stream object unit containing requested search time with reference to the retrieved search time information;

retrieving reference information on arrival time added to the start transport stream unit of the accessed stream object unit;

determining the arrival time of the start transport stream unit, using the retrieved arrival time reference information and a time value calculated from the search time information corresponding to the accessed stream object unit; and compensating the determined arrival time based upon comparison between the retrieved arrival time reference information and the search time information corresponding to the accessed stream object unit.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIGS. 6(a) and 6(b) are tables showing the general time information for a recorded data stream;

DETAILED DESCRIPTION OF TEE PREFFERRED MODES

In order that the invention may be fully understood, preferred embodiments thereof will now be described with reference to the accompanying drawings.

Figure 7:
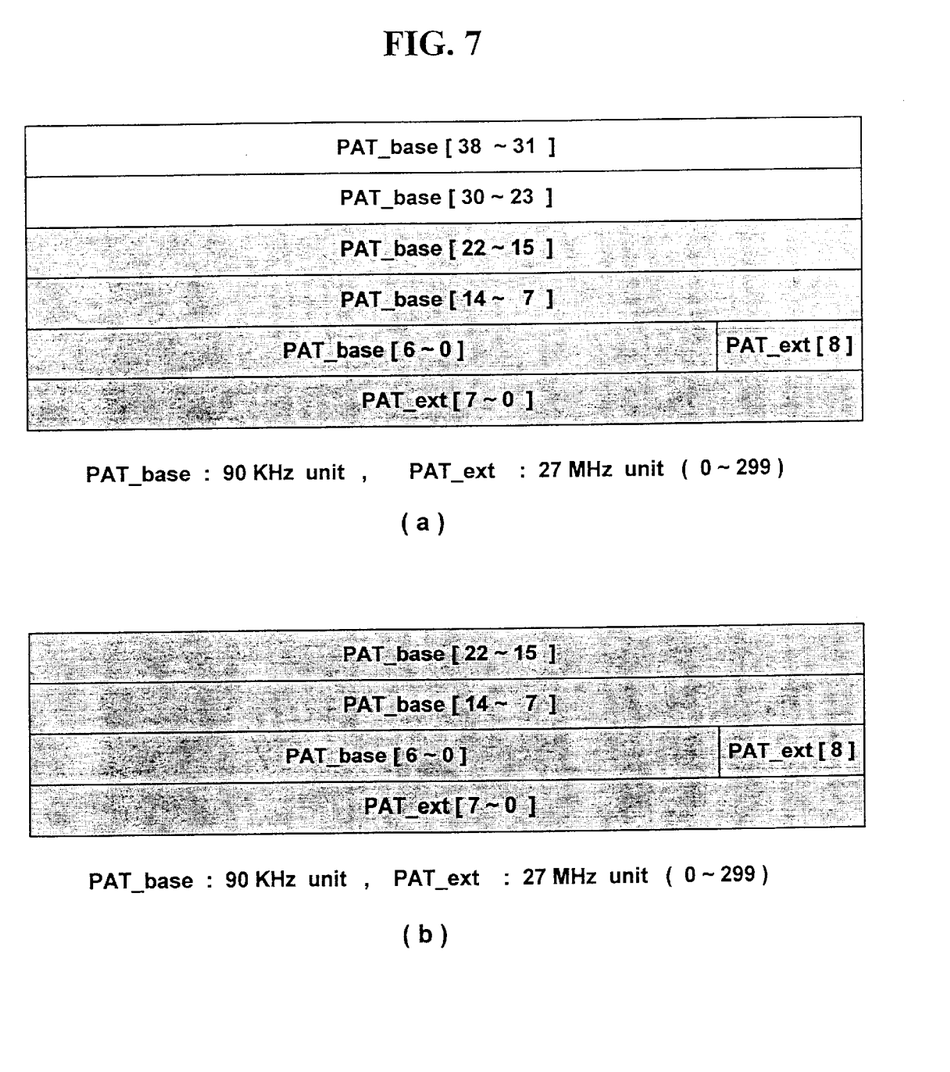
FIGS. 7(a) and 7(a) are tables showing the time information for a recorded data stream according to an embodiment of the resent invention.
Figure 8:
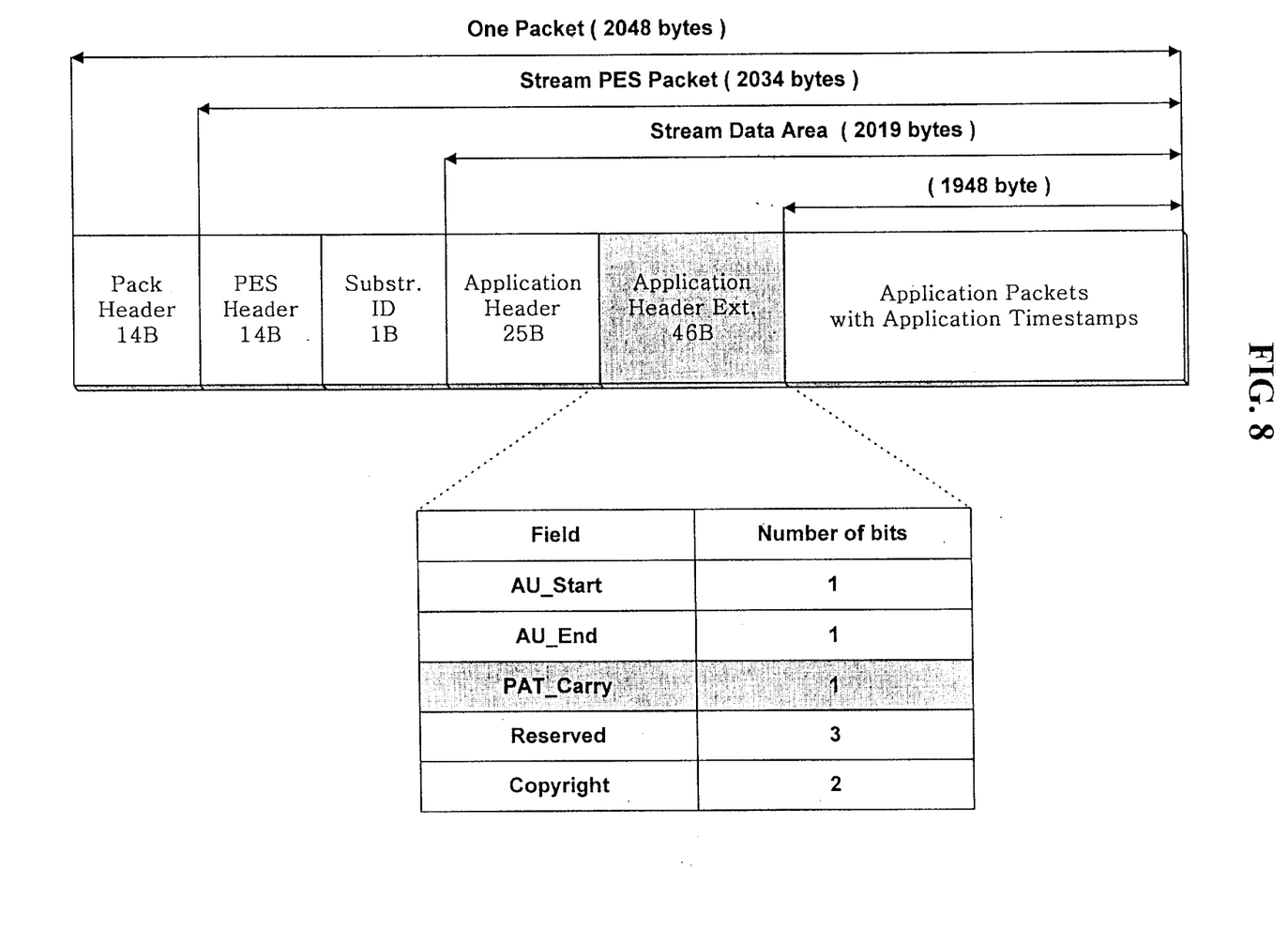
FIG. 8 is a pictorial representation of the reset indication information according to an embodiment of the resent invention.

FIGS. 7(a), 7(b) and 8 depict the data format of the stream start application packet arrival time (S_S_APAT) and packet arrival time (PAT) in accordance with an embodiment of the invention. When the control unit 250 of the streamer 200 records the stream start application packet arrival time (S_S_APAT) contained in the stream object general information (SOB GI) on the recording medium 230, the stream start application packet arrival time (S_S_APAT) is recorded as 6-byte data comprising a 9-bit packet arrival time extension (PAT_ext)and a 39-bit packet arrival time base (PAT_base) in accordance with the MPEG format.

The packet arrival time extension (PAT_ext) is a module-300 counter that is incremented at a rate of 27 MHz, whereas the packet arrival time base (PAT_base) is incremented at a rate of 90 kHz. On the other hand, the packet arrival time (PAT) of a transport stream packet received through the communication interface 210 is 4-byte data comprising a 9-bit packet arrival time extension (PAT_ext) and 23-bit packet arrival time base (PAT base). Like the stream start application packet arrival time (S_S_PAT), the packet arrival time extension (PAT_ext)is a module-300 counter that is incremented at a rate of 27 MHz and the packet arrival time base (PAT base) is incremented at a rate of 90 kHz.

In consequence, the 4-byte packet arrival time (PAT) of a transport stream packet has the same format as the lower 4 bytes of the 6-byte stream start application packet arrival time (S_S_APAT) and thus the lower 4-byte data of a stream start application packet arrival time (S_S_APAT) always coincides with one of the recorded 4-byte packet arrival times (PATs). Also, there is certainly a packet arrival time (PAT) coinciding with the lower 4-byte data of the search time (ST) requested by a user, the 6-byte search time (ST) comprising a packet arrival time base (PAT_base) and a packet arrival time extension (PAT_ext) specified by the MPEG format.

The 4-byte packet arrival time (PAT) of a transport stream packet can represent up to 93.2 s (93.2–223/90 kHz) since its packet arrival time base (PAT_base) is 23-bit data that is incremented at a rate of 90 kHz. The packet arrival time (PAT) is reset to zero whenever the value reaches the limit. The control unit 250 keeps examining occurrence of reset. If reset occurs, the control unit 250 controls the stream recording unit 220 to record information indicative of the occurrence of reset (PAT_carry) in the header information area pertaining to a sector comprising a plurality of transport stream packets (TSPs) and header information, as explained before with reference to FIG. 3.

The reset indication information is used in the case of data search. The reset indication information (PAT_carry) may be recorded as 1-bit data in the application header extension area, one of header information contained in the associated sector.

Figure 9:
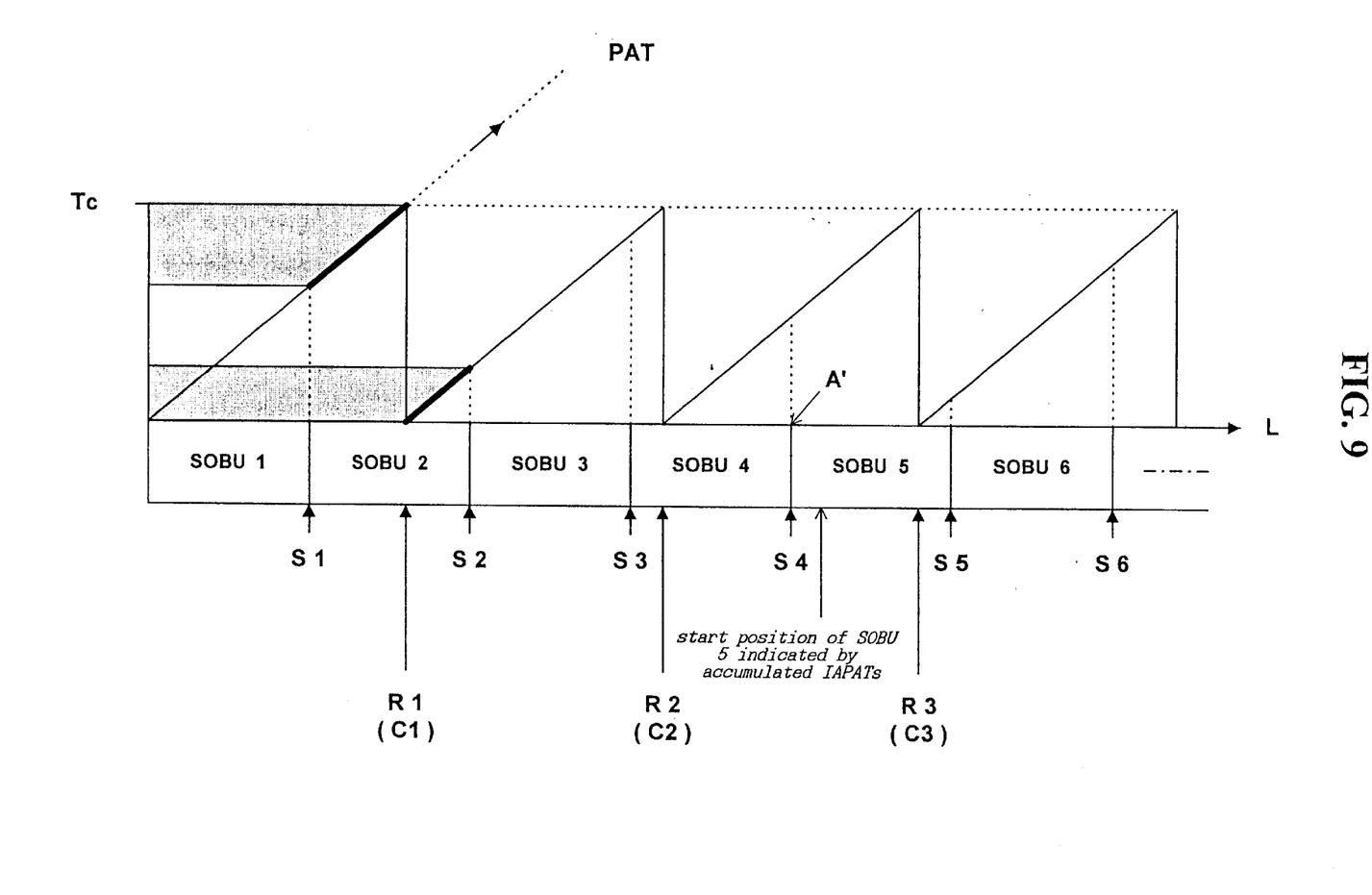
FIG. 9 is a pictorial representation of the relation between a stream object unit and the time information according to an embodiment of the present invention.

FIG. 9 shows the way the packet arrival time (PAT) of each transport stream packet is created when a digital data stream received by the set top box 100 is recorded by the streamer 200. It is assumed that a stream object unit (SOBU) is made up of 32 sectors with each sector having 2048 bytes and the transfer rate of the data stream is not higher than 10 kbps. Hence, the time needed to record a stream object unit (SOBU) is 52.4 s (52.4=32 sectors×2048 bytes/10 kbps) and the packet arrival time (PAT) is reset at 93.2 s intervals.

In other words, a stream object unit is created every 52.4 s (S1, S2, . . . ), and the packet arrival time (PAT) is reset every 93.2 s (R1, R2, . . . ) and so the reset indication information (PAT_carry) is also created every 93.2 s (C1, C2, . . . ). As a result, the packet arrival times (PATS) of all transport stream packets belonging to a stream object unit (SOBU) have mutually exclusive values as long as the transfer rate of the digital data stream exceeds 10 kbps.

The method for searching for the position (s) of a transport stream packet corresponding to the search time (ST) requested by a user from the data stream recorded as shown in FIG. 9 will be explained with reference to FIG. 2. First, the stream start application packet arrival time (S_S_APAT) contained in the stream object general information (SOB_GI) of each stream object (SOB) is compared with the requested search time (ST) and a stream start application packet arrival time (S_S_APAT) that is closest to but does not exceed the request search time (ST) is detected. Referring to the mapping list (MAPL) of the stream object SOB #1 containing the detected stream start application packet arrival time (S_S_APAT), the incremental application packet arrival time (IAPAT 1~4) contained in the mapping list (MAPL) are summed up. The sum value is multiplied by the unit time (x) and added to the stream start application packet arrival time (S_S_APAT). The procedure is repeated until the calculated value (S_S_APAT+x(ΣIAPAT)) approaches the requested search time (ST) without exceeding it. In FIG. 2, the summation and multiplication is repeated to include IAPAT 4 because the calculated value (S_S_APAT+x(ΣIAPAT)) exceeds the search time (ST) if the calculation continues to IAPAT 5. The stream object corresponding to the calculated value is SOBU 5, which corresponds to the upper 2-byte data of the search time (ST) requested by the user.

From the start position A' of the searched stream object SOBU 5, the 4-byte packet arrival time (PAT) of each transport stream packet is detected. The detected packet arrival time (PAT) is compared with the lower 2-byte data of the search time (ST) requested by the user to find the transport stream packet (TS) the packet arrival time (PAT) of which coincides with the lower 2-byte data of the search time (ST)

In summary, using the stream start application packet arrival time (S_S_APAT) and incremental application packet arrival time (IAPAT) contained in the mapping list, the stream object unit SOBU5 corresponding to the upper-unit time data of the requested search time (ST) is detected and then a transport stream packet the packet arrival time of which coincides with the lower-unit time data of the search time (ST) is detected. As a result, the position of the detected transport stream packet coincides with the requested search time (ST)

In this case, however, if the 4-byte packet arrival time added to each transport stream packet overflows after the start of the associated stream object unit (SOBU) and before certain unit time elapses, the actual packet arrival time may become different from the arrival time of the first transport stream packet calculated based on the incremental application packet arrival time in the mapping list. This case will be explained in detail with-reference to FIG. 10.

Figure 10:
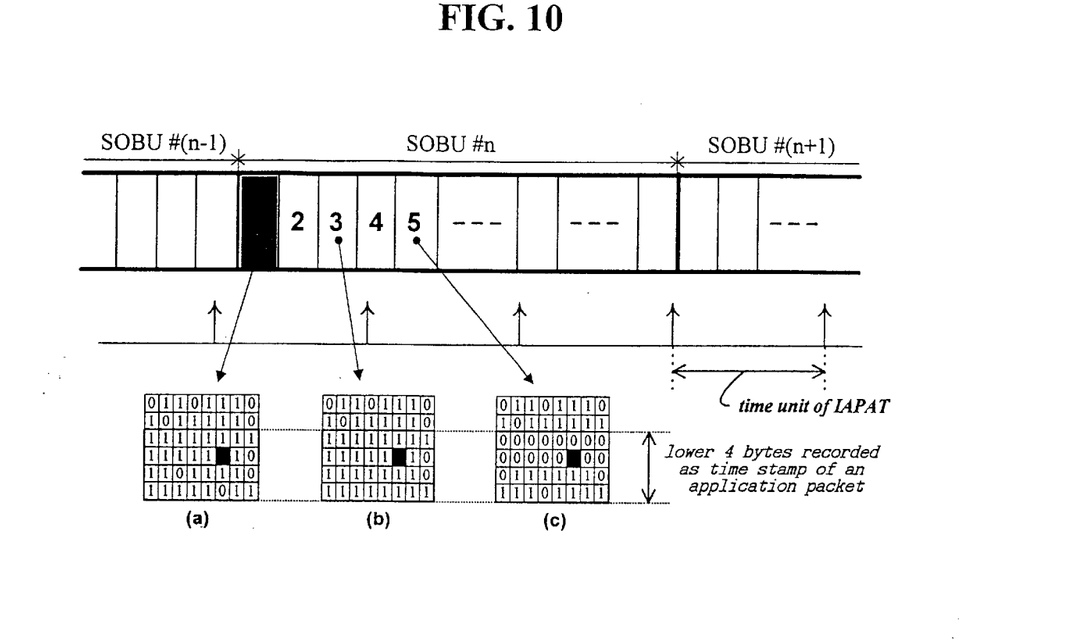
FIG. 10 is a pictorial representation of the packet arrival time of transport stream packets recorded as 4-byte data.

FIG. 10 depicts an example where the packet arrival time of each transport stream packet being received is recorded as 4-byte data. In this case, it is assumed that the unit time of the incremental application packet arrival time (IAPAT) corresponds to the bit3 of the 4th byte of the packet arrival time (the bit shaded in FIG. 10). Therefore, whenever the unit time elapses, the bit3 of the 4th byte is toggled.

In FIG. 10, the packet arrival time reference information ((a) in FIG. 10) of the first transport stream packet of the nth stream object unit (SOBU #n) is FFFEDEFB$_{(16)}$ and the packet arrival time reference information ((b) in FIG. 10) of the third transport stream packet is FFFEFEFF$_{(16)}$. Because the unit time elapses after the third transport stream packet arrives, the lower 4 bytes of the 6 bytes indicative of the packet arrival time are reset after the third transport stream packet arrives and before the unit time elapses and a carry is propagated to the upper 2 bytes. Accordingly, the fifth transport stream packet, for example, has the arrival time reference information of 00007EEF$_{(16)}$, which is less than the previous value.

The upper 2 bytes of the actual packet arrival time of the first transport stream packet are 6EBE$_{(16)}$ but the value is not recorded on the recording medium. In the case of data search, therefore, the upper 2 bytes are calculated based on the incremental application packet arrival time (IAPAT) information. However, because a carry already exists before the first time duration of the unit time of the incremental application packet arrival time (IAPAT) elapses within the associated stream object unit (SOBU), the value of the upper 2 bytes obtained based on the incremental application packet arrival time (IAPAT) information is greater than that of the upper 2 bytes of the actual packet arrival time by 1. For this reason, in the case of data search, the upper 2 bytes calculated base on the incremental application packet arrival time (IAPAT) information should be not regarded as the upper 2 bytes prefixed to the 4-byte arrival time reference information detected from the transport stream packet.

Figure 11:
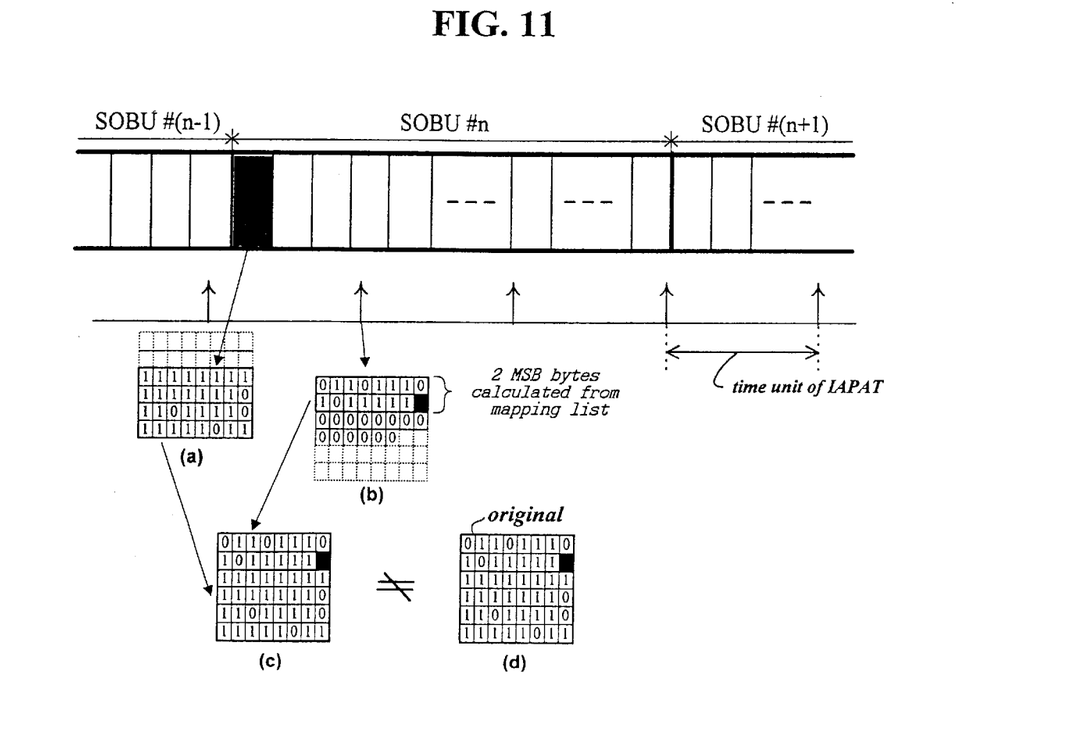
FIG. 11 is a pictorial representation showing the case where the arrival time information obtained in FIG. 10 differs from the actual packet arrival time.

FIG. 11 depicts the case where a carry is generated as explained before. It is shown that the actual packet arrival time ((d) in FIG. 11) differs from the 6-byte packet arrival time ((c) in FIG. 11) comprising the upper 2 bytes ((b) in FIG. 11) calculated based on the incremental application packet arrival time (IAPAT) information and the 4 byte arrival time reference information ((a) in FIG. 11) detected from the first transport stream packet.

In FIG. 11, the time information corresponding to a stream object unit (SOBU) calculated based on the incremental application packet arrival time (IAPAT) information is expressed by the upper 3 bytes and upper 6 bits of the forth byte. This is because the unit time of the incremental application packet arrival time (IAPAT) does not have time resolution lower than 218 bits.

In order to compensate for the error in the calculated packet arrival time, therefore, it is inevitable to check whether the 4-byte packet arrival time reference information generated a carry after the first packet of an arbitrary stream object unit (SOBU) arrives and before the unit time of the incremental application packet arrival time (IAPAT) elapses.

To this end, the control unit 250 compares the lower 14 bits of the 30-bit time information calculated based on the incremental application packet arrival time (IAPAT) information with the upper 14 bits of the 4-byte arrival time reference information of the first transport stream packet of the current stream object unit (SOBU) and concludes that a carry is generated if the latter is greater than the former. If so, the control unit 250 subtracts the least significant bit of the upper 2-bytes from the 30 bits calculated based on the incremental application packet arrival time (IAPAT) information, takes the 2-byte result as the upper 2 bytes of the packet arrival time of the first transport stream packet of the associated stream object unit, and compares the packet arrival time with the requested search time.

In the example shown in FIG. 11, the number 11111111111111$_{(2)}$ is greater than the number 00000000000000$_{(2)}$ and thus the upper 2 bytes of the arrival time of the first transport stream packet is obtained by subtracting 0001000000000$_{(16)}$ from 6EBFXXXXXXXX$_{(16)}$ and taking the upper 2 bytes from the result. As a result, the time information comprising the 2-byte data and the 4-byte packet arrival time detected from the transport stream packet is used in the case of data search.

The existence of carry may be checked in a different manner. For example, the control unit 250 retrieves all data of the sectors constituting the associated stream object unit and checks the reset indication information (PAT_carry) recorded in the header information in each sector. If any of the reset indication information indicates carry, the packet arrival time can be corrected by the aforementioned method. Otherwise, the upper 2 bytes of the value calculated based on the incremental application packet arrival time information can be used as the upper 2 bytes of the packet arrival time.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for searching recorded digital data streams, comprising the steps of:

(a) retrieving search time information comprising count values counted at constant time intervals while each stream object unit is recorded, each stream object unit having a predetermined number of transport stream units;

(b) accessing a stream object unit containing requested search time with reference to the retrieved search time information;

(c) retrieving reference information on arrival time added to the start transport stream unit of the accessed stream object unit;

(d) determining the arrival time of the start transport stream unit, using the retrieved arrival time reference information and a time value calculated from the search time information corresponding to the accessed stream object unit; and (e) compensating the determined arrival time based upon comparison between the retrieved arrival time reference information and the search time information corresponding to the accessed stream object unit, wherein said step (e) comprises:

(e2) judging whether the arrival time reference information added to each transport stream unit has been reset between the start time of the accessed stream object unit and the time value calculated from the search time information corresponding to the accessed stream object unit.

2. The method set forth in claim 1, wherein said step (d) determines the arrival time of the start transport stream unit by regarding a most significant part of the calculated time value as the upper time unit of the arrival time reference information.

3. The method set forth in claim 1, wherein said step (e) further comprises:

(e1) comparing the retrieved arrival time reference with a part of the time value calculated from the search time information corresponding to the accessed stream object unit;

(e3) correcting the determined arrival time by a predetermined value, wherein said step (e2) is performed based upon the comparison result from said step (e1).

4. An apparatus for searching recorded digital data streams, comprising:

retrieving means for retrieving search time information containing count values counted at constant time intervals while each stream object unit having a predetermined number of transport stream units is recorded, and accessing to reproduce a stream object unit containing requested search time with reference to the retrieved search time information; and control means for comparing an arrival time reference information added to a start transport stream unit of the accessed stream object unit with a time value calculated from the search time information corresponding to the accessed stream object unit, judging whether the arrival time reference information added to each transport stream unit has been reset between the start time of the accessed stream object unit and the time value calculated from the search time information corresponding to the accessed stream object unit, and compensating an arrival time of the start transport stream unit determined by using the arrival time reference information and the time value, based upon the comparison result.

5. The apparatus set forth in claim 4, wherein said control means determines the arrival time of the start transport stream unit by regarding a most significant part of the calculated time value as the upper time unit of the arrival time reference information.

6. The apparatus set forth in claim 4, wherein said control means compares the arrival time reference information with a part of the time value calculated from the search time information corresponding to the accessed stream object unit, judges whether the arrival time reference information added to each transport stream unit has been reset based upon the comparison result, and corrects the determined arrival time by subtracting a predetermined value from the determined arrival time.

7. An apparatus for searching recorded digital data streams, comprising:

a data reproducer for retrieve search time information containing count values counted at constant time intervals while each stream object unit having a predetermined number of transport stream units is recorded and to access to reproduce a stream object unit containing requested search time with reference to the retrieved search time information; and a controller to compare an arrival time reference information added to a start transport stream unit of the stream object unit accessed by said data reproducer with a time value calculated from the search time information corresponding to the accessed stream object unit, and to compensate an arrival time of the start transport stream unit determined by using the arrival time reference information and the time value, based upon the comparison result, wherein said controller compares the arrival time reference information with a part of the time value calculated from the search time information corresponding to the stream object unit, judges whether the arrival time reference information added to each transport stream unit has been reset between the start time of the accessed stream object unit and the time calculated from the search time information corresponding to the stream object unit accessed by said data reproducer based upon the comparison result, and corrects the determined arrival time by subtracting a predetermined value from the determined arrival time.

8. The apparatus set forth in claim 7, wherein said controller determines the arrival time of the start transport stream unit by regarding a most significant part of the calculated time value as the upper time unit of the arrival time reference information.

* * * * *